United States Patent
Keshavan et al.

(10) Patent No.: US 10,891,980 B1
(45) Date of Patent: Jan. 12, 2021

(54) CENTRAL SUPPORT FOR IMPROVED STRUCTURAL DYNAMICS OF ACTUATORS IN A MULTI-ACTUATOR HARD DISK DRIVE

(71) Applicant: Western Digital Technologies, Inc., San Jose, CA (US)

(72) Inventors: Manoj Keshavan, San Jose, CA (US); Jung-Seo Park, San Jose, CA (US); Hiromitsu Masuda, Odawara (JP); Shigenori Takada, Kawasaki (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/359,941

(22) Filed: Mar. 20, 2019

Related U.S. Application Data

(60) Provisional application No. 62/676,801, filed on May 25, 2018.

(51) Int. Cl.
　　*G11B 5/55* 　　(2006.01)
　　*G11B 5/012* 　　(2006.01)
　　*G11B 25/04* 　　(2006.01)
　　*G11B 5/48* 　　(2006.01)

(52) U.S. Cl.
　　CPC .......... *G11B 5/5578* (2013.01); *G11B 5/012* (2013.01); *G11B 5/4813* (2013.01); *G11B 5/5521* (2013.01); *G11B 25/043* (2013.01)

(58) Field of Classification Search
　　None
　　See application file for complete search history.

(56) References Cited

U.S. PATENT DOCUMENTS

| 6,005,743 | A | 12/1999 | Price et al. |
| 6,034,834 | A | 3/2000 | Yoshikawa et al. |
| 6,121,742 | A | 9/2000 | Misso |

(Continued)

FOREIGN PATENT DOCUMENTS

WO　　WO2010107395 A1　　9/2010

OTHER PUBLICATIONS

Anonymous, Dual Actuator tuned mass damper pivot bearing, ip.com, Feb. 1, 2000, 1 page, ip.com disclosure No. IPCOM000013589D, IBM, US.

(Continued)

*Primary Examiner* — Craig A. Renner
(74) *Attorney, Agent, or Firm* — John D. Henkhaus

(57) ABSTRACT

A multi-actuator data storage device such as a hard disk drive may include a lower actuator-pivot-VCM assembly including a lower pivot shaft and a lower motor assembly, an upper actuator-pivot-VCM assembly including an upper pivot shaft and an upper motor assembly, and a central support structure or plate sandwiched between the lower and upper pivot shafts and the lower and upper motor assemblies. The central support structure may be shaped to make contact with the motor assemblies only at discrete assembly locations and to make contact with the pivot shafts at opposing raised pads. Viscoelastic dampers may be adhered to the central support structure at the contact locations to dampen motor vibrational modes and/or to reduce the amplitude of vibration transmitted among the actuator-pivot assemblies. Such an assembly may increase the tilt and in-phase butterfly mode frequencies and decrease the gains of the tilt and coil torsion modes.

22 Claims, 9 Drawing Sheets

(56) References Cited

U.S. PATENT DOCUMENTS

| | | |
|---|---|---|
| 6,449,130 B1 | 9/2002 | Koyama |
| 6,490,138 B1 | 12/2002 | Prater |
| 6,560,075 B2 | 5/2003 | Price et al. |
| 6,687,092 B2 | 2/2004 | Kan et al. |

OTHER PUBLICATIONS

Anton Shilov, Seagate's Multi Actuator Technology to Address HDD IOPS Woes, AnandTech, Dec. 29, 2017, 6 pages, downloaded from https://www.anandtech.com/show/12169/seagates-multi-actuator-technology-to-double-hdd-performance.

POSITION A LOWER ACTUATOR-PIVOT-VCM ASSEMBLY WITHIN AN ENCLOSURE BASE OF A HARD DISK DRIVE, WHEREIN THE LOWER ACTUATOR-PIVOT-VCM ASSEMBLY COMPRISES A LOWER BEARING ASSEMBLY INTERPOSED BETWEEN A LOWER PIVOT SHAFT AND A LOWER ACTUATOR ROTATABLE BY A LOWER VOICE COIL MOTOR (VCM) ASSEMBLY
602

POSITION A SUPPORT PLATE STRUCTURE WITHIN THE ENCLOSURE BASE AND ONTO THE LOWER ACTUATOR-PIVOT-VCM ASSEMBLY
604

POSITION AN UPPER ACTUATOR-PIVOT-VCM ASSEMBLY WITHIN THE ENCLOSURE BASE AND ONTO THE SUPPORT PLATE STRUCTURE, WHEREIN THE UPPER ACTUATOR-PIVOT-VCM ASSEMBLY COMPRISES AN UPPER BEARING ASSEMBLY INTERPOSED BETWEEN AN UPPER PIVOT SHAFT AND AN UPPER ACTUATOR ROTATABLE BY AN UPPER VOICE COIL MOTOR (VCM) ASSEMBLY
606

SANDWICH, WHILE NOT ATTACHING, THE SUPPORT PLATE STRUCTURE BETWEEN THE LOWER AND UPPER ACTUATOR-PIVOT-VCM ASSEMBLIES BY INSERTING A RESPECTIVE COMMON FASTENER, AT EACH OF ONE OR MORE COMMON ASSEMBLY POSITIONS, THROUGH THE LOWER ACTUATOR-PIVOT-VCM ASSEMBLY, THE SUPPORT PLATE STRUCTURE, AND THE UPPER ACTUATOR-PIVOT-VCM ASSEMBLY
608

INSERT A COMMON PIVOT FASTENER, AT A COMMON PIVOT POSITION, THROUGH A COVER OF THE HARD DISK DRIVE, THE UPPER PIVOT SHAFT, THE SUPPORT PLATE STRUCTURE, AND THE LOWER PIVOT SHAFT TO THE ENCLOSURE BASE
610

FIG. 6

CENTRAL SUPPORT FOR IMPROVED STRUCTURAL DYNAMICS OF ACTUATORS IN A MULTI-ACTUATOR HARD DISK DRIVE

CROSS-REFERENCE TO RELATED APPLICATIONS

This application claims the benefit of priority to U.S. Provisional Patent Application Ser. No. 62/676,801, entitled "Central Support For Improved Structural Dynamics Of Actuators In A Multi-Actuator Hard Disk Drive" filed May 25, 2018, the entire content of which is incorporated by reference for all purposes as if fully set forth herein.

FIELD OF EMBODIMENTS

Embodiments of the invention may relate generally to data storage devices such as hard disk drives and particularly to approaches for improving the structural dynamics of the actuators in a multi-actuator hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. The high latencies of large capacity HDDs in a clustered environment, such as in data centers with multiple clustered nodes, limits their appeal due to slower access to stored data. This has led to the need to develop and implement various means to increase high-capacity HDD performance.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 6 is a flowchart illustrating a method of manufacturing a multi-actuator assembly with a central support structure, according to an embodiment.

DETAILED DESCRIPTION

Generally, approaches to improving the structural dynamics of an actuator system in a multi-actuator hard disk drive are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment. In the following description, for the purposes of explanation, numerous specific details are set forth in order to provide a thorough understanding of the embodiments of the invention described herein. It will be apparent, however, that the embodiments described herein may be practiced without these specific details. In other instances, well-known structures and devices may be shown in block diagram form in order to avoid unnecessarily obscuring the embodiments described herein.

Physical Description of an Illustrative Operating Context

Embodiments may be used in the context of a digital data storage device (DSD), such as a hard disk drive (HDD).

Figure 1:
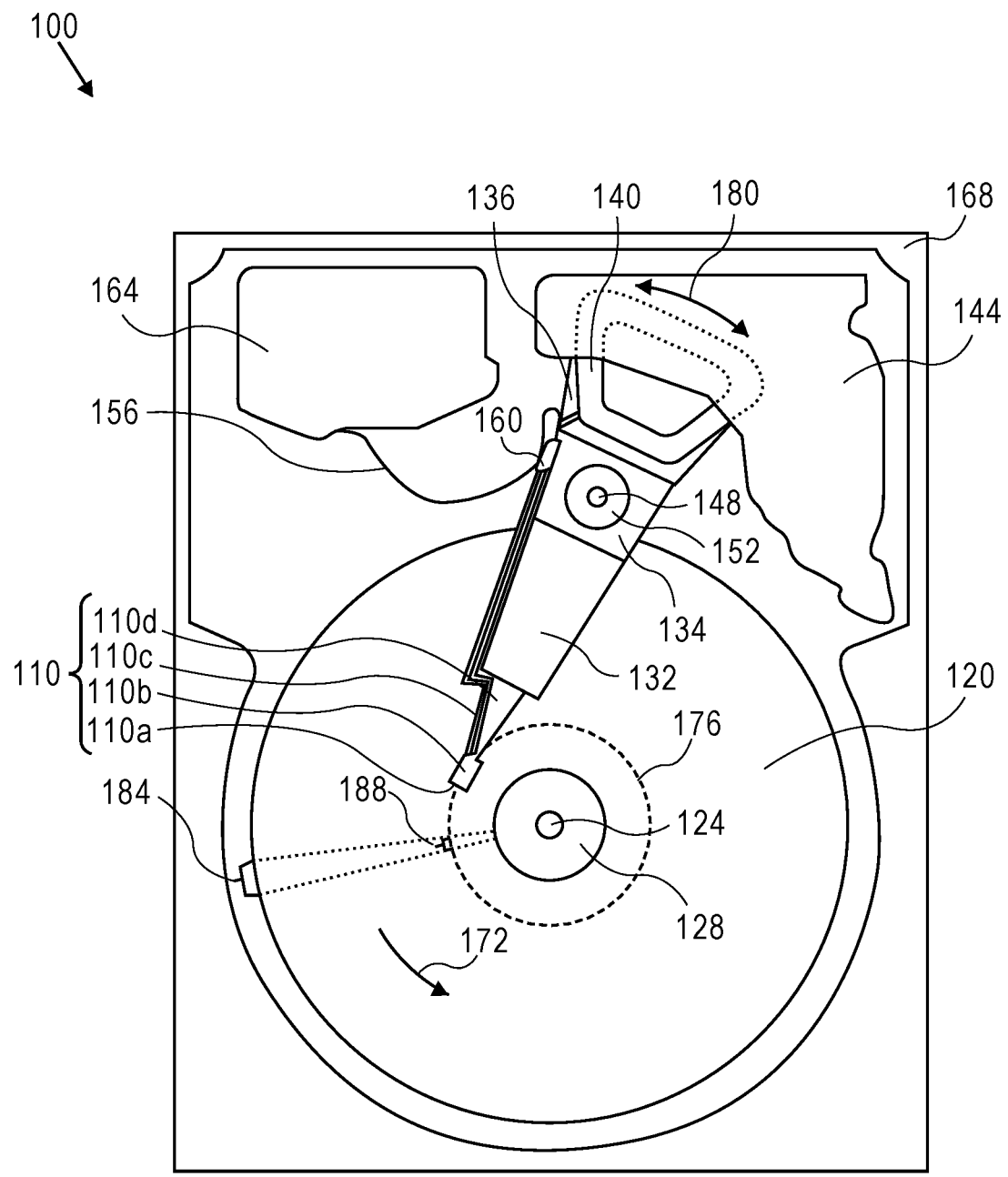
FIG. 1 is a plan view illustrating a hard disk drive (HDD), according to an embodiment.

Thus, in accordance with an embodiment, a plan view illustrating an HDD 100 is shown in FIG. 1 to illustrate an exemplary operating context.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

Figure 2A:
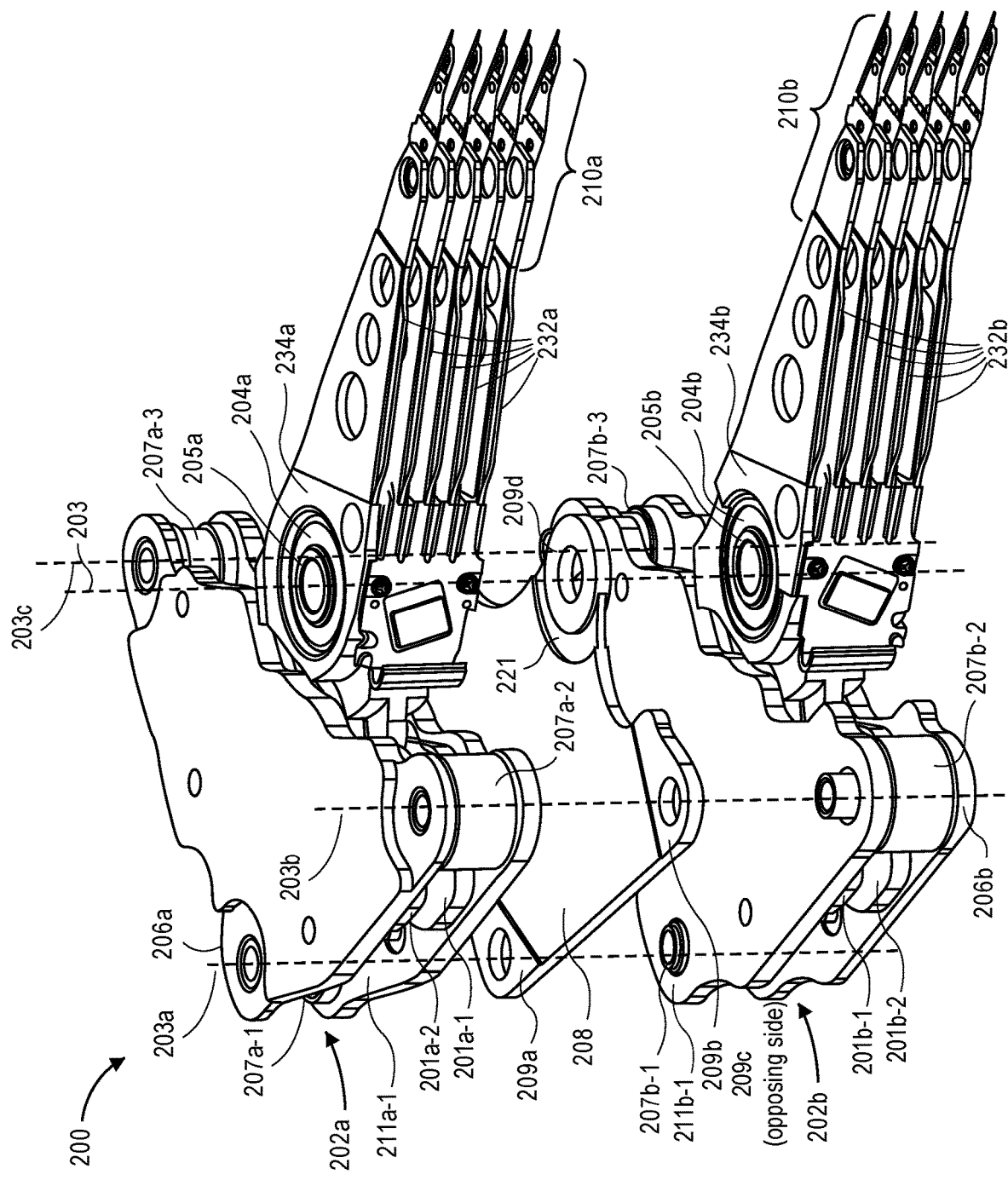
FIG. 2A is an exploded perspective view illustrating a multi-actuator assembly with a central support structure, according to an embodiment.
Figure 2B:
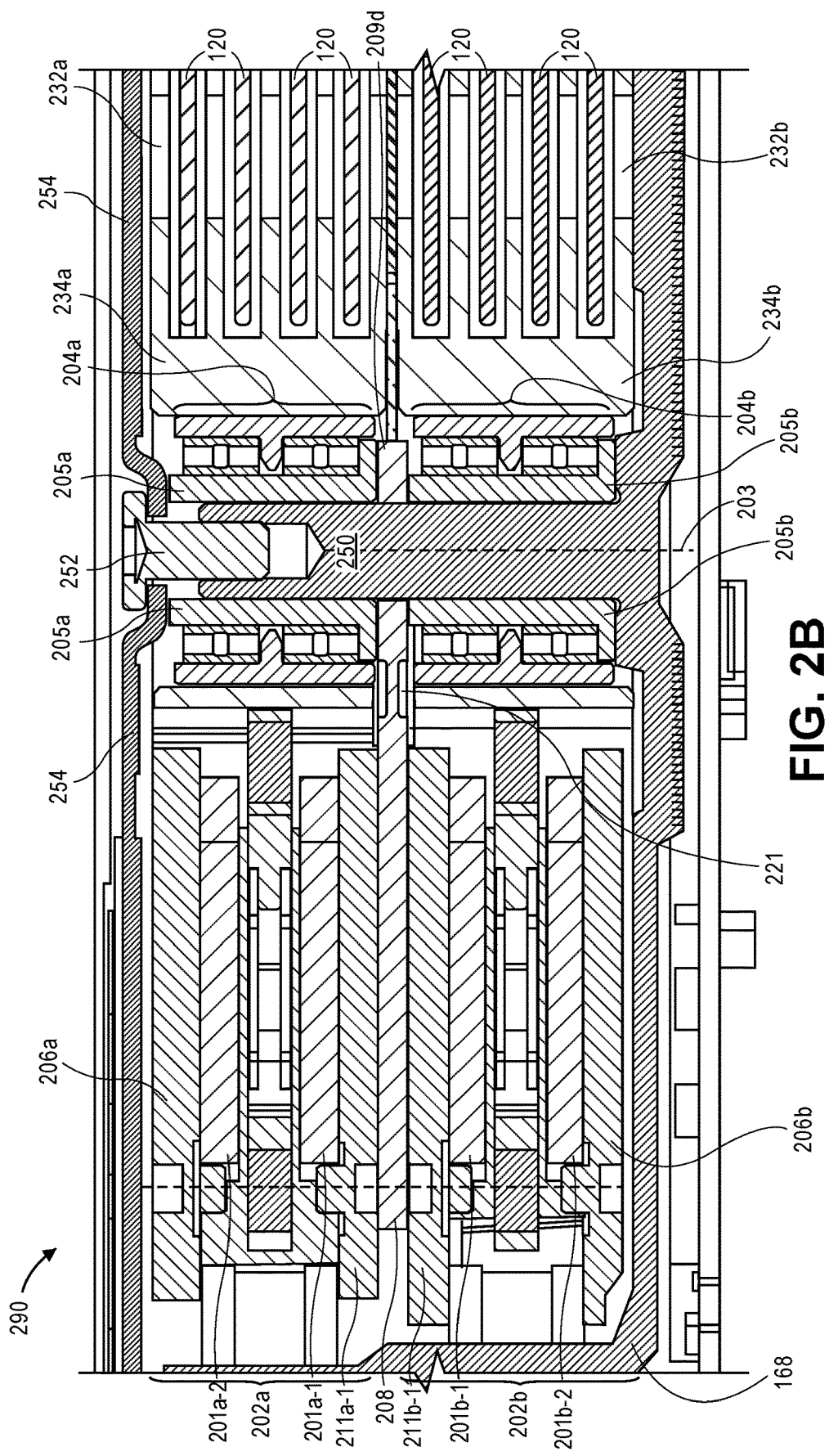
FIG. 2B is a cross-sectional side view illustrating a hard disk drive including a multi-actuator assembly with a central support structure, according to an embodiment.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible in this view, see, e.g., magnets 201a-1, 201a-2, 201b-1, 201b-2 of FIGS. 2A, 2B). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall the observation that the performance of high-capacity HDDs has not scaled up commensurately with increases in storage capacity. This TOPS/TB (referred to as "TOPS density", where "TOPS" refers to input/output per second) deficit stands in the way of widespread adoption of such HDDs. In other words, the high latencies of large capacity HDDs in a clustered environment, such as in data centers with multiple clustered nodes, limits their appeal due to slower access to stored data. The pressure to increase the performance (e.g., TOPS/TB) by reducing the latencies for data operations of high-capacity HDDs has become even stronger in view of the market penetration that solid-state storage continues to achieve.

Historically, there have been no commercially available disk drives that have multiple actuators stacked on the same rotational axis. Reasons for this include technical challenges from vibration coupling between actuators, packaging challenges related to housing two independently operating actuators within a prescribed form factor, and due to a lack of a real need for such disk drives from a market perspective. Previous dual actuator implementations have focused on actuators on separate rotational axes in a disk drive servicing a single disk stack, though these have seen limited market acceptance.

Nonetheless, one possible approach to increasing HDD performance is the implementation of multi-actuator systems, in which multiple independently operating actuators are assembled onto a single shared pivot shaft in order to independently and concurrently read from and/or write to multiple recording disks of a disk stack. However, the operation of multiple actuators on a shared pivot shaft structurally couples the vibration modes of the independently operating actuators, leading to the transfer of vibrational energy between actuators systems by way of the shared shaft. That is, operation (i.e., rotary movement) of one actuator generates forces that transfer via the shared shaft to the other actuator(s). This vibration transferred to the other actuator(s) affects the ability of the corresponding read-write transducer (or "head") to efficiently arrive at and to stay on-track, resulting in excessive track mis-registration ("TMR"). TMR limits the performance of HDDs in that an inordinate amount of time is expended trying to position and maintain the head well-centered over a data track (e.g., via servoing). The corresponding read and write operations are effectively delayed as a result, thus reducing overall I/O performance.

The number of actuators that may be assembled onto a shared pivot shaft may vary from implementation to implementation; however, an exemplary but non-limiting dual-actuator arrangement is described throughout herein.

Multi-Actuator System with Central Support Structure

Approaches described herein enable the use of independent pivot assemblies (and hence separate pivot shafts) for, in this case, the two actuators. The adverse effects of structural dynamics coupling between actuators are mitigated by providing a laterally stiff interface (center plate) between the opposing pivot shafts of the actuator-pivot assemblies. This increases the frequencies of key structural modes such as tilt and in-phase butterfly modes while also reducing the gains of lower frequency modes such as coil torsion. The addition of dampers may further reduce the gain of problematic VCM modes.

FIG. 2A is an exploded perspective view illustrating a multi-actuator assembly with a central support structure, and FIG. 2B is a cross-sectional side view illustrating a hard disk drive including a multi-actuator assembly with a central support structure, according to an embodiment. According to an embodiment, a hard disk drive comprises a multi-actuator assembly 200 comprising two (for purposes of a non-limiting example) independent actuator systems 202a, 202b (may also be referred to as "actuator-pivot-VCM assembly"), which can be independently optimized, sharing the same rotational axis 203 and capable of concurrently servicing a respective disk stack (see, e.g., a stack of multiple recording media 120 of FIG. 1). Each of the two actuator systems 202a, 202b comprises its own respective pivot bearing assembly 204a, 204b (see, e.g., pivot bearing assembly 152 of FIG. 1), and are physically separate from each other. Each actuator system 202a, 202b also comprises its own voice coil motor (VCM) assembly 206a, 206b comprising respective magnets 201a-1, 201a-2 and 201b-1, 201b-2. The two actuator systems 202a, 202b are stacked on top of each other in a modular fashion, with each of the two pivot shafts 205a, 205b (see, e.g., pivot shaft 148 of FIG. 1) engaging a common post 250 that is integrated with the enclosure base (e.g., HDD housing 168 of FIG. 1, also referred to as a Motor Base Assembly (MBA)), according to an embodiment. Similar to FIG. 1, each actuator system 202a, 202b further comprises a respective carriage 234a, 234b (see, e.g., carriage 134 of FIG. 1), a set or comb of arms 232a, 232b (see, e.g., arm 132 of FIG. 1) coupled therewith, and a set of HGAs 210a, 210b (see, e.g., HGA 110 of FIG. 1) coupled therewith.

In a scenario in which the present embodiment is not incorporated, the two pivot shafts would be preloaded directly against each other by the clamping action of the cover screw against the pivot shaft as it is screwed into the base post. However, the lateral or sway stiffness at the interface between the pivot shafts may not be high enough to prevent a high gain of tilt and coil torsion modes along with a drop in frequency of the in-phase butterfly mode. This would degrade the system dynamics to the extent of negating the intended performance gains expected from implementing a multi-actuator configuration.

According to an embodiment a central support structure 208 (or "support plate") is sandwiched (and preferably compressed) between the pivot shafts 205a, 205b of the two actuator-pivot assemblies and also between the two VCM assemblies 206a, 206b, and provides a high sway (lateral) stiffness interface to overcome the degradation in tilt and in-phase butterfly modes described elsewhere herein. Specifically, the tilt and in-phase butterfly mode frequencies are increased, thereby enabling a higher servo system bandwidth, and the respective gains of the tilt and coil torsion modes are decreased, thus assisting with faster settle times.

A "drop-in" design leverages the existing layout for high-capacity enterprise drives. The central support structure 208 is sandwiched between the pole pieces 211a-1 and 211b-1 of the upper and the lower VCM assemblies 206a, 206b, and makes contact with the poles at three discrete pads 209a, 209b, 209c (opposing side, not visible here). It uses existing features (holes) in the VCM posts 207a-1, 207a-2, 207a-3, 207b-1, 207b-2, 207b-3 for fasteners that clamp the VCM assemblies 206a, 206b and the central support structure 208 together. Similarly, the central support structure 208 has tightly controlled seat surfaces and an associated hole for engaging the base post 250. The seat surfaces are clamped between the opposing pivot shaft 205a, 205b surfaces using the same attachment scheme as in current capacity enterprise disk drives, e.g., by way of screw 252 through cover 254 into post 250 (FIG. 2B). According to an embodiment, the central support structure 208 may be composed of ferritic steel such as SUS430, which results in an up to 3.5% VCM torque constant increase over a non-magnetic austenitic steel.

According to an embodiment, a low bending stiffness of the central support structure 208 allows it to flex sufficiently to account for differing stack-up tolerances between the VCM assemblies 206a, 206b, which mate with the central support structure 208 at respective opposing pads 209a-209c of the support structure 208, and the pivot assemblies (e.g., 204a/205a, 204b/205b assemblies), which mate with the central support structure 208 at pad 209d (shown circumscribed in part by neck 221, for an example) of the support structure 208. The bending stiffness can be controlled (e.g., reduced) by either locally reducing the thickness of a neck region (see, e.g., FIGS. 3B, 3D), according to one embodiment, or by reducing the thickness uniformly over the entire main plate region of the support structure not comprising the pad or seat surfaces, according to another embodiment.

Central Support Structures

FIGS. 3A-3F are each a perspective view illustrating a central support structure, according to embodiments. While these perspective views are unable to illustrate both sides of each central support structure, except for central support structure 358 of FIG. 3F, both sides of the central support structure are configured the same, as described hereafter for the illustratable side.

Figure 3A:
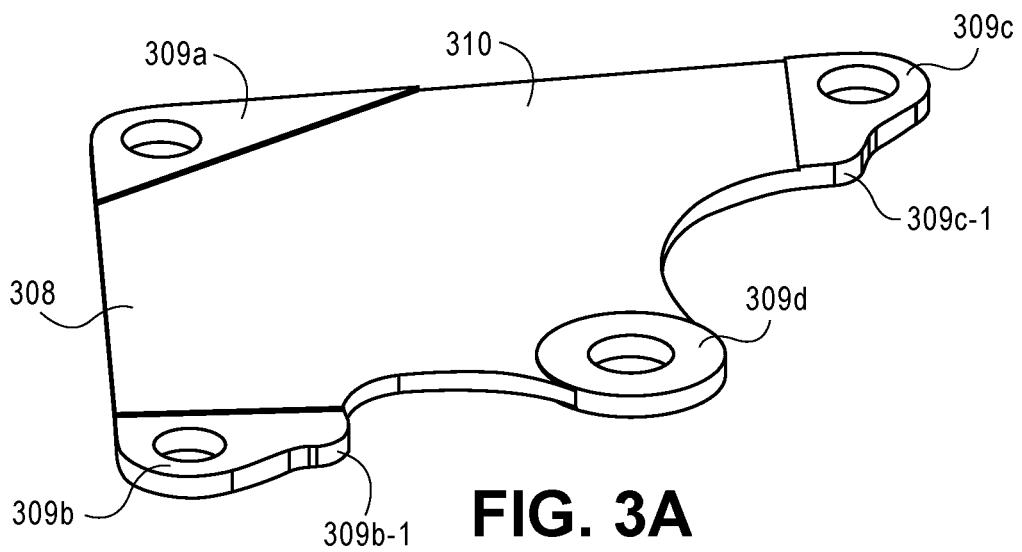
FIG. 3A is a perspective view illustrating a central support structure, according to a first embodiment.

FIG. 3A is a perspective view illustrating a central support structure, according to a first embodiment. FIG. 3A depicts central support structure 308 comprising a main plate region 310 and raised pads 309a, 309b, 309c on opposing sides of the support structure 308 (only visible here on one side of the support structure 308) for contacting with a respective VCM assembly at discrete assembly locations, such as VCM assembly 206a, 206b (FIGS. 2A, 2B). The main plate region 310 has a first planar surface and each raised pad 309a, 309b, 309c has a second planar surface extending a distance from the first planar surface of the main plate region 310, where each raised pad 309a, 309b, 309c comprises a hole through which a respective common fastener is receivable (and "received" when assembled with the actuator systems 202a, 202b (FIGS. 2A, 2B)) for sandwiching together a first (e.g., top) VCM assembly 206a, the support structure 308, and a second (e.g., bottom) VCM assembly 206b. According to an embodiment, raised pads 309b, 309c are configured with a respective integrated bump feature 309b-1, 309c-1 as illustrated in FIG. 3A, for ease of assembly purposes, e.g., for mechanical tooling purposes to restrain the support structure 308 when installing the upper VCM assembly 206a.

Support structure 308 further comprises raised pad 309d on opposing sides of the support structure 308 (only visible here on one side of the support structure 308) for contacting with a respective pivot shaft, such as pivot shaft 204a, 204b (FIGS. 2A, 2B). Raised pad 309d comprises a hole for receiving a common post 250 (FIG. 2B) that is integrated with the enclosure base (e.g., HDD housing 168 of FIG. 1) for sandwiching together a first (e.g., top) pivot shaft 204a, the support structure 308, and a second (e.g., bottom) pivot shaft 204b using screw 252 (FIG. 2B).

According to an embodiment, the central support structure 308 (and, likewise, each respective central support structure 318-358 of FIGS. 3B-3F) is not physically attached or fastened to either VCM assembly 206a, 206b when assembled therewith. Rather, common fasteners are used to sandwich/clamp the support structure 308 between the VCM assemblies 206a, 206b by way of each VCM post pair 207a-1/207b-1, 207a-2/207b-2, 207a-3/207b-3 (FIG. 2A), e.g., the holes of the support structure are not themselves threaded.

Figure 3B:
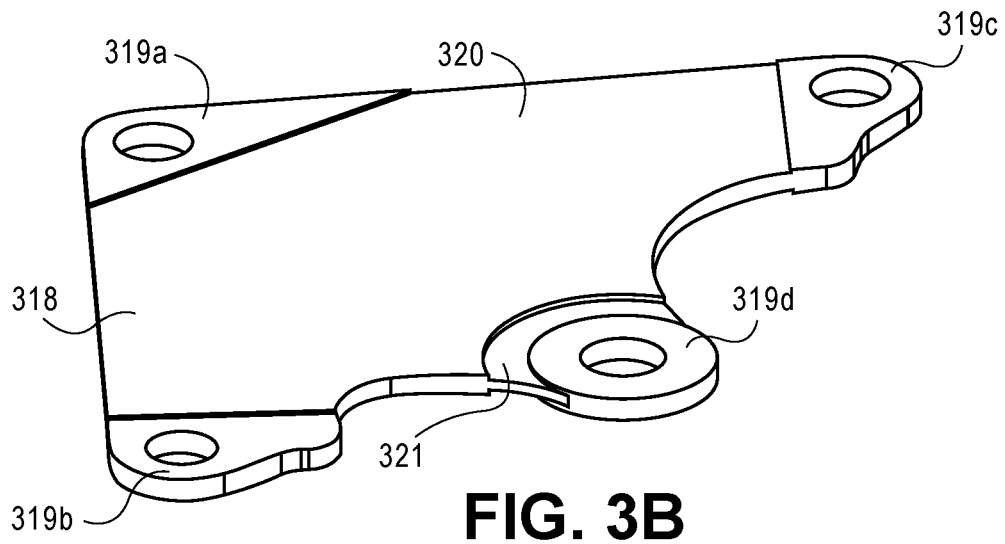
FIG. 3B is a perspective view illustrating a central support structure, according to a second embodiment.

FIG. 3B is a perspective view illustrating a central support structure, according to a second embodiment. FIG. 3B depicts central support structure 318, structurally configured largely similarly to central support structure 308 (FIG. 3A), with the addition of a neck 321 area or region. Thus, central support structure 318 comprises a main plate region 320 and opposing raised pads 319a, 319b, 319c for contacting with a respective VCM assembly at discrete assembly locations, such as VCM assembly 206a, 206b (FIGS. 2A, 2B), where the main plate region 320 has a first planar surface and each raised pad 319a, 319b, 319c has a second planar surface extending a distance from the first planar surface of the main plate region 320 and comprising a hole through which a respective common fastener is receivable (and "received" when assembled with the actuator systems 202a, 202b (FIGS. 2A, 2B)), for sandwiching together a first (e.g., top) VCM assembly 206a, the support structure 318, and a second (e.g., bottom) VCM assembly 206b. Likewise, support structure 318 further comprises opposing raised pad 319d for contacting with a respective pivot shaft, such as pivot shaft 204a, 204b (FIGS. 2A, 2B), where raised pad 319d comprises a hole for receiving a common post 250 (FIG. 2B) that is integrated with the enclosure base (e.g., HDD housing 168 of FIG. 1) for sandwiching together a first (e.g., top) pivot shaft 204a, the support structure 318, and a second (e.g., bottom) pivot shaft 204b.

As mentioned, central support structure 318 comprises a neck 321 area between the raised pad 319d (pivot pad) and the main plate region 320 and having a third planar surface recessed a distance from the first planar surface of the main plate region 320. According to an embodiment, the third planar surface is further recessed a distance from the second planar surface of the raised pad 319*d* greater than the distance that the third planar surface is recessed from the first planar surface 320 (see, e.g., FIG. 4C). The neck 321 provides some physical flexibility (i.e., reduced stiffness in the area of neck 321) for the support structure 318, to account for part and assembly tolerance differences or mismatches. That is, because on one side of the neck 321 the support structure 318 mates with a VCM assembly 206*a*, 206*b* and on the other side of the neck 321 the support structure 318 mates with a pivot shaft 204*a*, 204*b*, where the sub-assemblies on each side of the neck 321 are likely to have different z-direction (axial) tolerance buildups, the flexibility afforded the support structure 318 by way of the reduced stiffness neck 321 provides for accommodation of the differing physical/mechanical tolerances on each side of the neck 321 in the context of a complete installation. While the neck 321 illustrated in FIG. 3B is annular and coaxial with the raised pad 319*d* and the hole therethrough, the shape and configuration of the neck 321 may vary from implementation to implementation and still meet the foregoing described purpose.

Figure 3C:
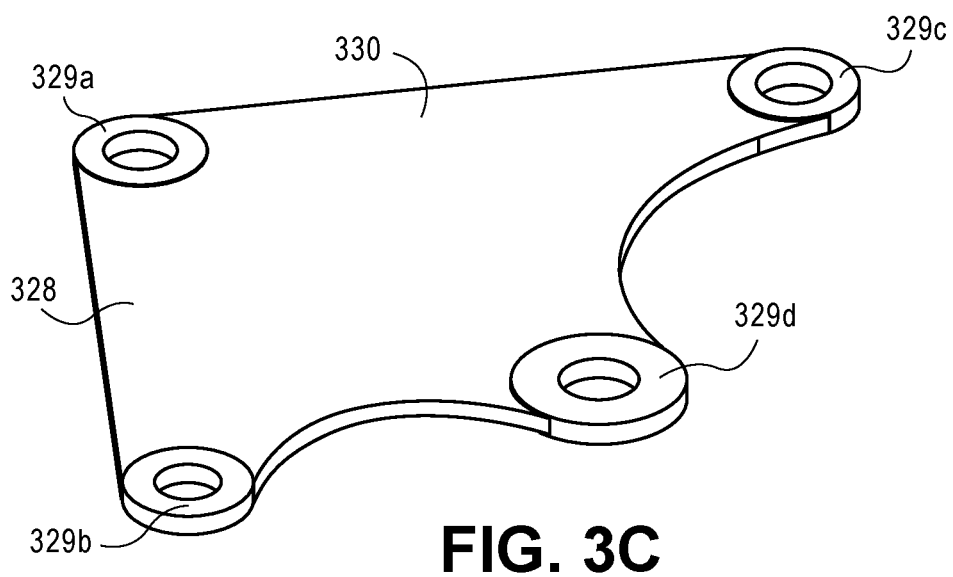
FIG. 3C is a perspective view illustrating a central support structure, according to a third embodiment.

FIG. 3C is a perspective view illustrating a central support structure, according to a third embodiment. FIG. 3C depicts central support structure 328, comprising a main plate region 330 and opposing raised pads 329*a*, 329*b*, 329*c* for contacting with a respective VCM assembly at discrete assembly locations, such as VCM assembly 206*a*, 206*b* (FIGS. 2A, 2B), where the main plate region 330 has a first planar surface and each raised pad 329*a*, 329*b*, 329*c* has a second planar surface extending a distance from the first planar surface of the main plate region 330 and comprising a hole through which a respective common fastener is receivable (and "received" when assembled with the actuator systems 202*a*, 202*b* (FIGS. 2A, 2B)), for sandwiching together a first (e.g., top) VCM assembly 206*a*, the support structure 328, and a second (e.g., bottom) VCM assembly 206*b*. One difference between support structure 328 and support structures 308, 318 (FIGS. 3A, 3B) is that the raised pads 329*b*, 329*c* do not have a feature such as the integrated bump feature 309*b*-1, 309*c*-1 as illustrated in FIG. 3A. However, support structure 328 further comprises opposing raised pad 329*d* for contacting with a respective pivot shaft, such as pivot shaft 204*a*, 204*b* (FIGS. 2A, 2B), where raised pad 329*d* comprises a hole for receiving a common post 250 (FIG. 2B) that is integrated with the enclosure base (e.g., HDD housing 168 of FIG. 1) for sandwiching together a first (e.g., top) pivot shaft 204*a*, the support structure 328, and a second (e.g., bottom) pivot shaft 204*b*. While support structure 328 may be a simpler design than support structures 308, 318, manufacturing of support structure 328 may require more and/or more complex machining steps/processes that may not be needed when manufacturing support structures 308, 318.

Figure 3D:
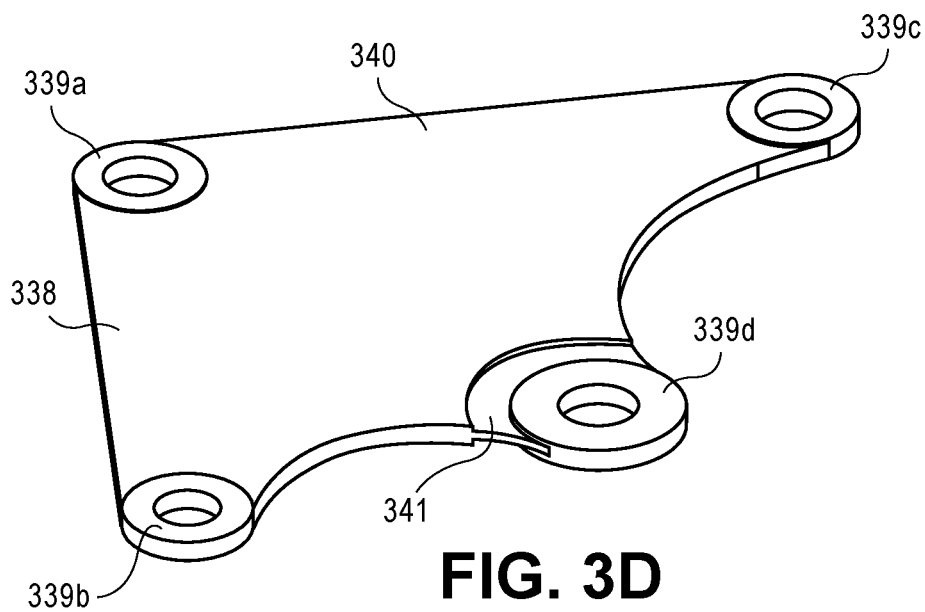
FIG. 3D is a perspective view illustrating a central support structure, according to a fourth embodiment.

FIG. 3D is a perspective view illustrating a central support structure, according to a fourth embodiment. What central support structure 318 (FIG. 3B) may be considered relative to central support structure 308 (FIG. 3A), central support structure 338 of FIG. 3D may be considered similarly relative to central support structure 328 (FIG. 3C). That is, central support structure 338 is configured similarly to central support structure 328, with the addition of a neck 341 area or region, for the same or similar purpose to provide mechanical flexibility to the support structure 338 (see, e.g., description corresponding to FIG. 3B). Thus, central support structure 338 comprises a main plate region 340 and opposing raised pads 339*a*, 339*b*, 339*c* for contacting with a respective VCM assembly at discrete assembly locations, such as VCM assembly 206*a*, 206*b* (FIGS. 2A, 2B), where the main plate region 340 has a first planar surface and each raised pad 339*a*, 339*b*, 339*c* has a second planar surface extending a distance from the first planar surface of the main plate region 340 and comprising a hole through which a respective common fastener is receivable (and "received" when assembled with the actuator systems 202*a*, 202*b* (FIGS. 2A, 2B)), for sandwiching together a first (e.g., top) VCM assembly 206*a*, the support structure 338, and a second (e.g., bottom) VCM assembly 206*b*. Likewise, support structure 338 further comprises opposing raised pad 339*d* for contacting with a respective pivot shaft, such as pivot shaft 204*a*, 204*b* (FIGS. 2A, 2B), where raised pad 339*d* comprises a hole for receiving a common post 250 (FIG. 2B) that is integrated with the enclosure base (e.g., HDD housing 168 of FIG. 1) for sandwiching together a first (e.g., top) pivot shaft 204*a*, the support structure 338, and a second (e.g., bottom) pivot shaft 204*b*.

Figure 3E:
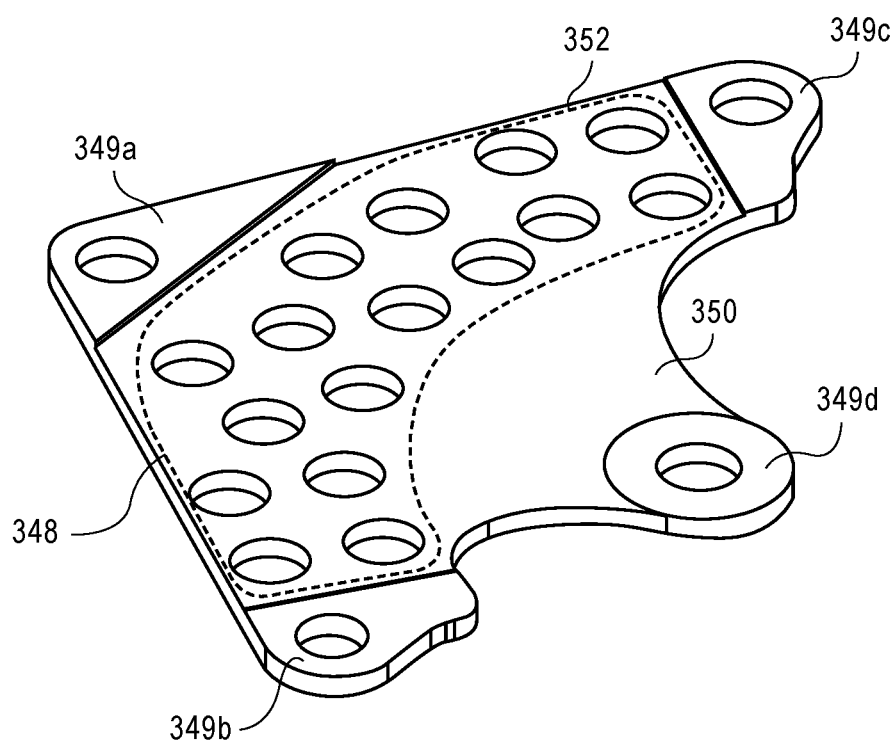
FIG. 3E is a perspective view illustrating a central support structure, according to a fifth embodiment.

FIG. 3E is a perspective view illustrating a central support structure, according to a fifth embodiment. FIG. 3E depicts central support structure 348, structurally configured largely similarly to central support structure 308 (FIG. 3A), with the addition of a hole feature (or a pattern of holes) 352 which can be incorporated into the plate to aid material flow (for manufacturability by stamping alone). In such a case, the holes of hole feature 352 are preferably located as far away from the pivot shaft seat region to ensure adequate sway (lateral) stiffness of the central support structure 348. Thus, central support structure 348 comprises a main plate region 350 and opposing raised pads 349*a*, 349*b*, 349*c* for contacting with a respective VCM assembly at discrete assembly locations, such as VCM assembly 206*a*, 206*b* (FIGS. 2A, 2B), where the main plate region 350 has a first planar surface and each raised pad 349*a*, 349*b*, 349*c* has a second planar surface extending a distance from the first planar surface of the main plate region 350 and comprising a hole through which a respective common fastener is receivable (and "received" when assembled with the actuator systems 202*a*, 202*b* (FIGS. 2A, 2B)), for sandwiching together a first (e.g., top) VCM assembly 206*a*, the support structure 348, and a second (e.g., bottom) VCM assembly 206*b*. Likewise, support structure 348 further comprises opposing raised pad 349*d* for contacting with a respective pivot shaft, such as pivot shaft 204*a*, 204*b* (FIGS. 2A, 2B), where raised pad 349*d* comprises a hole for receiving a common post 250 (FIG. 2B) that is integrated with the enclosure base (e.g., HDD housing 168 of FIG. 1) for sandwiching together a first (e.g., top) pivot shaft 204*a*, the support structure 348, and a second (e.g., bottom) pivot shaft 204*b*.

Figure 3F:
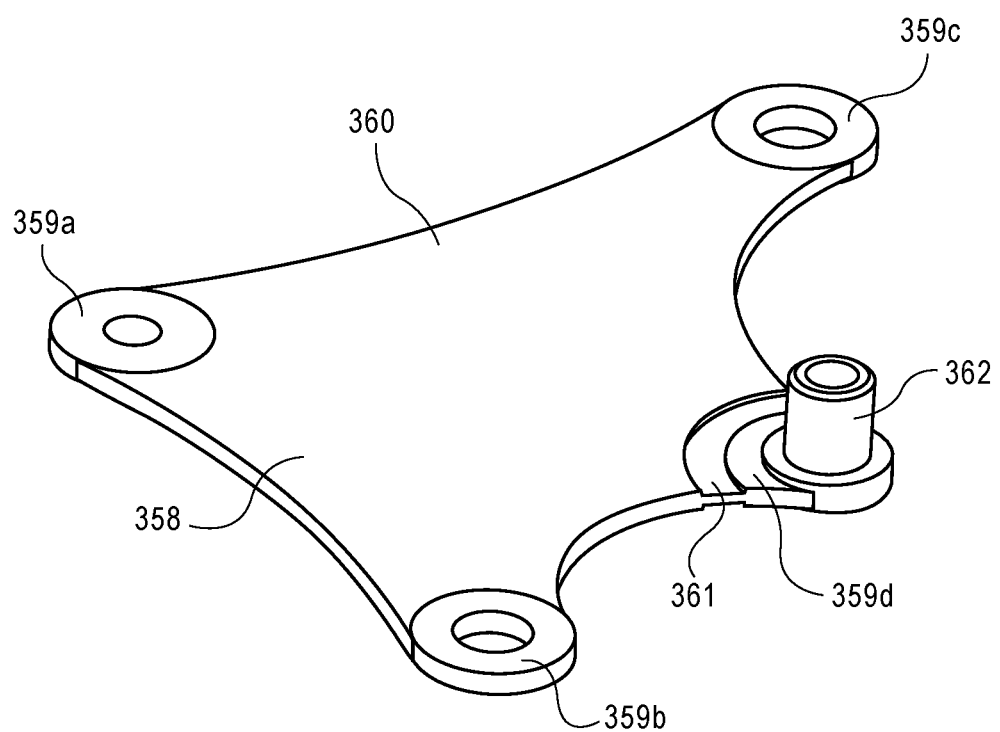
FIG. 3F is a perspective view illustrating a central support structure, according to a sixth embodiment.

FIG. 3F is a perspective view illustrating a central support structure, according to a sixth embodiment. Central support structure 358 is configured similarly to central support structure 338 (FIG. 3D), and a post 362 for facilitating a shorter post extending from the enclosure base which does not extend upward as far as the post 250 and the upper bearing assembly (e.g., bearing assembly 204*a*). Thus, post 362 effectively functions to extend the length of the base post for providing a post on which the upper bearing assembly may be mounted. Continuing, central support structure 358 comprises a main plate region 360 and opposing raised pads 359*a*, 359*b*, 359*c* for contacting with a respective VCM assembly at discrete assembly locations, such as VCM assembly 206*a*, 206*b* (FIGS. 2A, 2B), where the main plate region 360 has a first planar surface and each raised pad 359*a*, 359*b*, 359*c* has a second planar surface extending a distance from the first planar surface of the main plate region 360 and comprising a hole through which a respective common fastener is receivable (and "received" when assembled with the actuator systems 202a, 202b (FIGS. 2A, 2B)), for sandwiching together a first (e.g., top) VCM assembly 206a, the support structure 358, and a second (e.g., bottom) VCM assembly 206b. Likewise, support structure 358 further comprises opposing raised pad 359d for contacting with a respective pivot shaft, such as pivot shaft 204a, 204b (FIGS. 2A, 2B), where raised pad 359d is circumscribed in part by neck 361 and comprises a hole for receiving a common fastener for sandwiching together a first (e.g., top) pivot shaft 204a, the support structure 358, and a second (e.g., bottom) pivot shaft 204b.

Dampers for Central Support Structure

One or more dampers may be incorporated on the central support plate to damp out vibration of VCM modes. According to an embodiment, 3-layer dampers (e.g., viscoelastic adhesive (VEA)/steel (e.g., SS304)/VEA) are affixed to one or preferably both sides of the large main plate area of the central support plate such that the surfaces of the VEA are slightly higher than the surfaces of the pads.

Figure 4A:
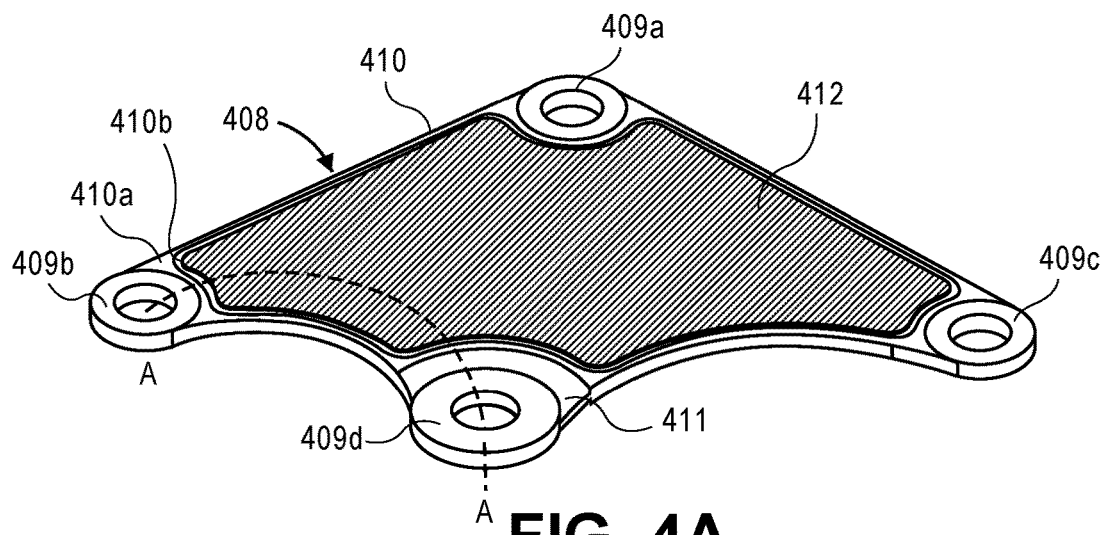
FIG. 4A is a perspective view illustrating a central support structure with a center plate damper, according to an embodiment.
Figure 4B:
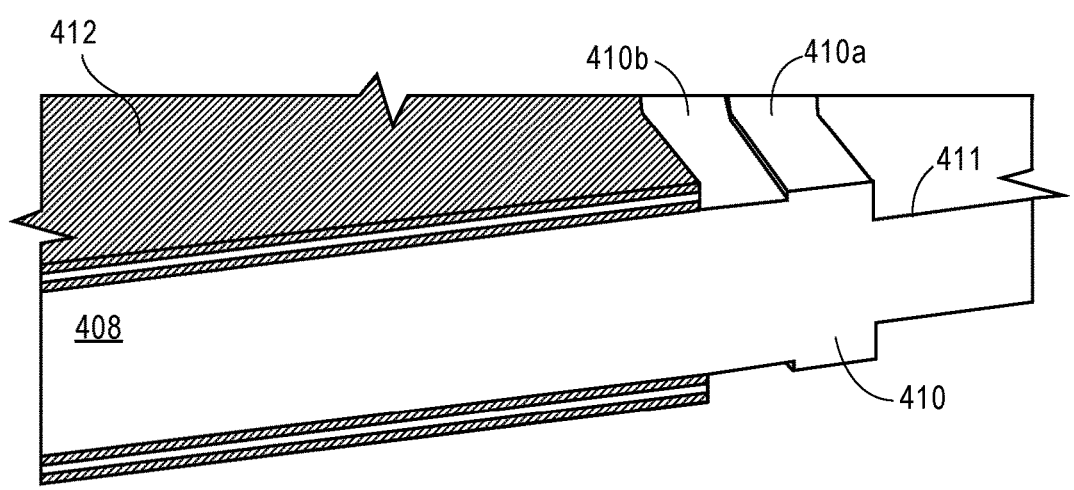
FIG. 4B is a cross-sectional perspective view illustrating a portion of the central support structure of FIG. 4A, according to an embodiment.
Figure 4C:
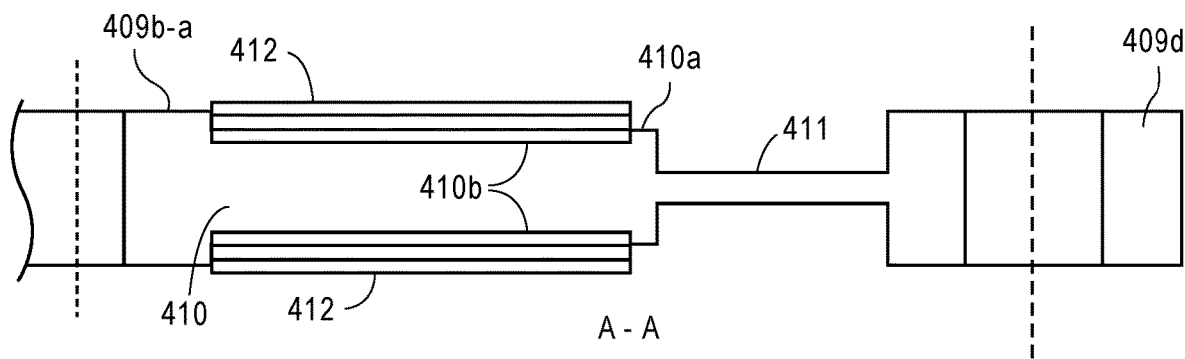
FIG. 4C is a cross-sectional perspective view illustrating a portion of the central support structure of FIG. 4A, according to an embodiment.

FIG. 4A is a perspective view illustrating a central support structure with a center plate damper; FIG. 4B is a cross-sectional perspective view illustrating a portion of the central support structure of FIG. 4A; and FIG. 4C is a cross-sectional (A-A of FIG. 4A) perspective view illustrating a portion of the central support structure of FIG. 4A (not necessarily to scale), according to an embodiment. The central support structure 408 illustrated in FIG. 4A is largely structurally configured similarly to central support structure 338 (FIG. 3D), with the addition of a damper 412 (e.g., 50 μm VEA/50 μm SS/50 μm VEA) recessed within a main plate region 410, preferably on both sides of the support structure 408. Thus, central support structure 408 comprises the main plate region 410 and opposing raised pads 409a, 409b, 409c for contacting with a respective VCM assembly at discrete assembly locations, where the main plate region 410 has a first planar surface 410a and a recessed surface 410b and each raised pad 409a, 409b, 409c has a second planar surface (see, e.g., 409b-a of FIG. 4C) extending a distance from the first planar surface 410a and the recessed surface 410b of the main plate region 410 and comprising a hole through which a respective common fastener is receivable. Likewise, support structure 408 further comprises opposing raised pad 409d for contacting with a respective pivot shaft, where raised pad 409d is circumscribed in part by neck 411 and comprises a hole for receiving a common post 250 (FIG. 2B) that is integrated with the enclosure base.

During actuator/VCM assembly, the VEA layers of the damper 412 on the central support structure 408 get compressed and bonded to the VCM pole pieces. Such an arrangement can effectively damp out modes of the VCM assemblies that have opposing phase relationships to each other and also improve robustness against external shock events. Alternatively and according to an embodiment, the 3-layer dampers may be replaced with a single 2-layer damper (e.g., VEA/SS304) or stacks of 2-layer dampers to help with disassembly when reworking HDDs. In such a scenario, the SS304 layers would be contacting the pole pieces of the VCM and the dampers would still be compressed between the upper and lower VCM assemblies, which may dampen motion of the central support structure 408 itself due to VCM assembly 206a, 206b and/or actuator assembly 202a, 202b motion (as the support structure 408 is not attached/fastened to either pivot shaft 205a, 205b).

Figure 5A:
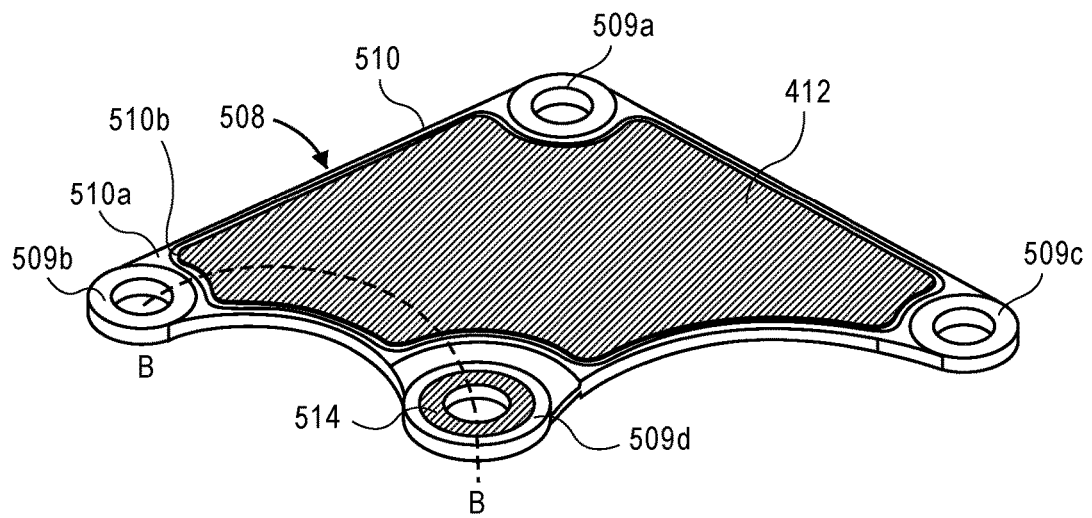
FIG. 5A is a perspective view illustrating a central support structure with a ring damper, according to an embodiment.
Figure 5B:
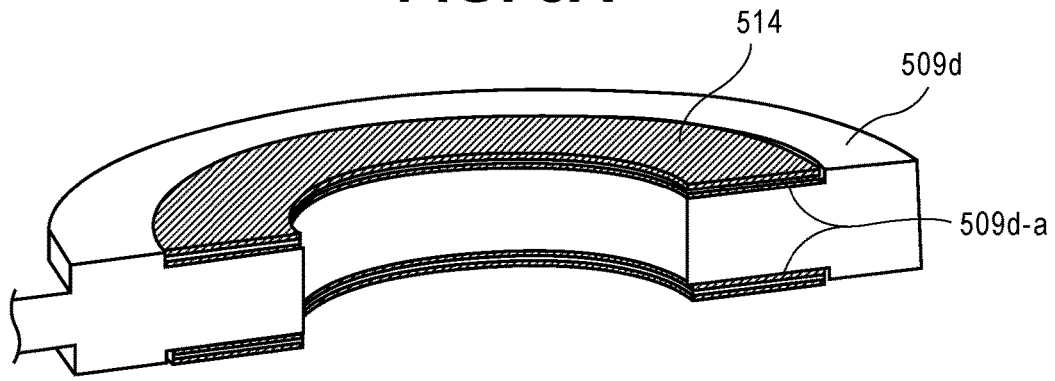
FIG. 5B is a cross-sectional perspective view illustrating a portion of the central support structure of FIG. 5A, according to an embodiment.
Figure 5C:
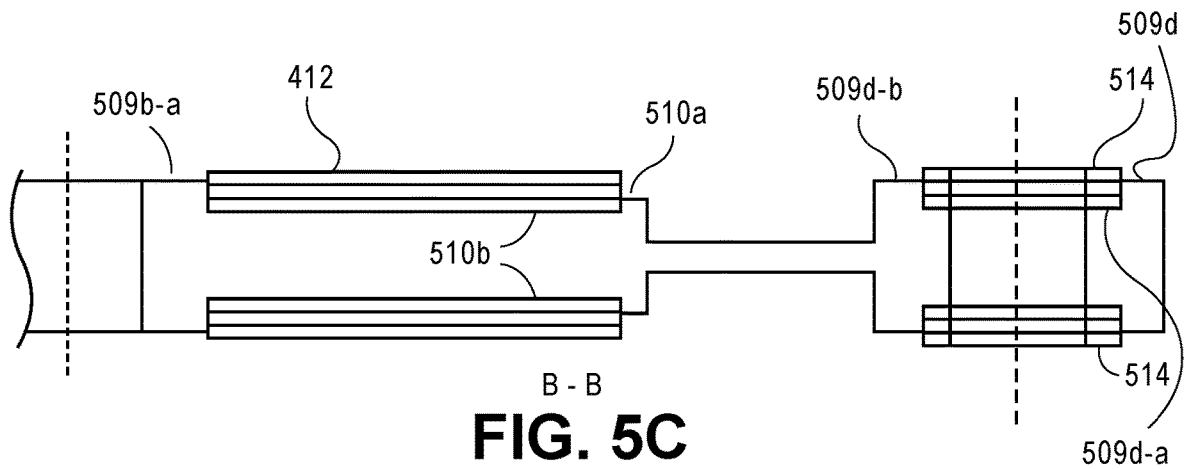
FIG. 5C is a cross-sectional perspective view illustrating a portion of the central support structure of FIG. 5A, according to an embodiment.

FIG. 5A is a perspective view illustrating a central support structure with a ring damper; FIG. 5B is a cross-sectional perspective view illustrating a portion of the central support structure of FIG. 5A; and FIG. 5C is a cross-sectional (B-B of FIG. 5A) perspective view illustrating a portion of the central support structure of FIG. 5A (not necessarily to scale), according to an embodiment. The central support structure 508 illustrated in FIG. 5A is largely structurally configured similarly to central support structure 338 (FIG. 3D) and is shown with (optional) the same or a similar damper as damper 412 (FIGS. 4A-4C), for the same or similar purpose to damp out vibration of VCM modes, with the addition of a ring damper 514 (e.g., 50 μm VEA/50 μm SS/50 μm VEA) recessed within a raised pivot pad 509d. Thus, central support structure 508 comprises the main plate region 510 and opposing raised pads 509a, 509b, 509c for contacting with a respective VCM assembly at discrete assembly locations, where the main plate region 510 has a first planar surface 510a and a recessed surface 510b and each raised pad 509a, 509b, 509c has a second planar surface (see, e.g., 509b-a of FIG. 5C) extending a distance from the first planar surface 510a and the recessed surface 510b of the main plate region 510 and comprising a hole through which a respective common fastener is receivable.

Support structure 508 further comprises opposing raised pad 509d for contacting with a respective pivot shaft, where raised pad 509d comprises a hole for receiving a common post 250 (FIG. 2B) that is integrated with the enclosure base. According to an embodiment, raised pad 509d comprises a recessed surface 509d-a in which the ring damper 514 is positioned, i.e., the flat seat surface of raised pad 409d (FIG. 4A) is replaced with a flat recessed surface 509d-a bordered by an outer raised lip surface 509d-b, which ensures metal-to-metal contact with the mating pivot shaft surfaces during cover assembly. The ring damper 514 (either 3-layer, adhered to a respective pivot shaft 205a, 205b, or 2-layer (e.g., 25 μm VEA/50 μm SS), single or stacked, not adhered to a respective pivot shaft 205a, 205b) is added in each recessed annular region of recessed surface 509d-a. By virtue of the ring damper 514 surfaces being higher than the raised lip surface 509d-b, the dampers are compressed between the pivot shaft surfaces during cover assembly. This arrangement may reduce the amplitude of vibration transmitted from one actuator assembly to the other (e.g., actuator assembly 202a, 202b of FIG. 2) via the pivot shafts (e.g., pivot shaft 205a, 205b of FIG. 2) and may also mitigate the effects from external shocks by way of added damping. Note that due to the possibility of a VCM boss extension height, which may affect the compression of the damper 412, the recessed surface 509d-a depth of the raised pad 509d may be greater than the recessed surface 510b depth of the main portion 510, to arrive at equivalent compression of both damper 412 and ring damper 514.

Based on the foregoing description, some non-limiting noteworthy features include that each described central support structure is a separate part and not an extension of the VCM pole pieces, which enables the VCMs to be designed independently of the central support structure without compromising VCM function, design, and performance. Furthermore, the central support structure does not control the concentricity of the upper and lower pivot shaft axes, as the pivot shaft surfaces of the two actuators are only pre-loaded against the central support structure. The base post and the pivot shafts control the alignment of the rotational axes of the actuator assemblies, rather than the central support plate or the VCM controlling the axes, which would make it dependent on a highly precise VCM design and assembly process, thereby perhaps being less practical. The central support plate design can be cost effectively manufactured and implemented within existing high-capacity enterprise drives without form factor excursions, e.g., according to an embodiment the pivot shafts are not independently attached to the central support plate, which might otherwise cause form factor excursions.

Method for Manufacturing a Multi-Actuator Assembly for Storage Device

FIG. 6 is a flowchart illustrating a method of manufacturing a multi-actuator assembly with a central support structure, according to an embodiment.

At block 602, a lower actuator-pivot-VCM assembly is positioned within an enclosure base of a hard disk drive, wherein the lower actuator-pivot-VCM assembly comprises a lower bearing assembly interposed between a lower pivot shaft and a lower actuator rotatable by a lower voice coil motor (VCM) assembly. For example, actuator assembly 202b is positioned within an enclosure base (e.g., HDD housing 168 of FIG. 1) of a hard disk drive 290 (FIG. 2B) (e.g., a multi-actuator version of HDD 100 of FIG. 1), wherein the lower actuator-pivot-VCM assembly comprises the lower bearing assembly 204b (FIGS. 2A, 2B) interposed between the lower pivot shaft 205b (FIGS. 2A, 2B) and the lower actuator (e.g., carriage 234b, actuator arms 232b, HGA 210b of FIGS. 2A, 2B) rotatable by the lower voice coil motor (VCM) assembly 206b (FIGS. 2A, 2B).

At block 604, a support plate structure is positioned within the enclosure base and onto the lower actuator-pivot-VCM assembly. For example, any of the central support structures 308-358, 408, 508 illustrated and described in reference to FIGS. 3A-3F, 4A, 5A is positioned within the base and onto the lower actuator-pivot-VCM assembly 202b.

At block 606, an upper actuator-pivot-VCM assembly is positioned within the enclosure base and onto the support plate structure, wherein the upper actuator-pivot-VCM assembly comprises an upper bearing assembly interposed between an upper pivot shaft and an upper actuator rotatable by an upper voice coil motor (VCM) assembly. For example, actuator assembly 202a (FIGS. 2A, 2B) is positioned within the base and onto the central support structure 308-358, 408, 508, wherein the upper actuator-pivot-VCM assembly comprises the upper bearing assembly 204a (FIGS. 2A, 2B) interposed between the upper pivot shaft 205a (FIGS. 2A, 2B) and the upper actuator (e.g., carriage 234a, actuator arms 232a, HGA 210a of FIGS. 2A, 2B) rotatable by the upper voice coil motor (VCM) assembly 206a (FIGS. 2A, 2B).

At block 608, the support plate structure is sandwiched between, while not attaching to, the lower and upper actuator-pivot assemblies by inserting a respective common fastener at each of one or more common assembly positions through the upper actuator-pivot-VCM assembly, the support plate structure, and the lower actuator-pivot-VCM assembly. For example, central support structure 308-358, 408, 508 is sandwiched between, while not attaching to, the upper and lower actuator-pivot assemblies 202a, 202b by inserting a respective common fastener (depicted simply in FIG. 2A as dashed lines 203a, 203b, 203c for purposes of drawing clarity) at each of one or more common assembly positions, through the upper actuator-pivot-VCM assembly 202a, the central support structure 308-358, 408, 508, and the lower actuator-pivot-VCM assembly 202b (e.g., at (a) upper VCM post 207a-1/raised pad 209a/lower VCM post 207b-1; (b) upper VCM post 207a-2/raised pad 209b/lower VCM post 207b-2; and (c) upper VCM post 207a-3/raised pad 209c/lower VCM post 207b-3, of FIG. 2A).

At block 610, a common fastener is inserted at a common pivot position through a cover of the hard disk drive, the upper pivot shaft, the support plate structure, and the lower pivot shaft to the enclosure base. For example, a common fastener such as screw 252 (FIG. 2B) is inserted at a common pivot position (e.g., at upper bearing assembly 204a/raised pad 209d/lower bearing assembly 204b), such as at rotational axis 203 (FIG. 2A, 2B), through the cover 254 (FIG. 2B) of the HDD 290, the upper pivot shaft 205a, the central support structure 308-358, 408, 508, and the lower pivot shaft 205b to the base 168 (FIG. 2B).

Consequently, providing a laterally stiff interface between the opposing pivot shafts of the two actuator-pivot assemblies may mitigate adverse effects of structural dynamics coupling between the actuator assemblies, by increasing the frequencies of key structural modes while also reducing the gains of lower frequency modes. Specifically, the tilt and in-phase butterfly mode frequencies are likely increased, thereby enabling a higher servo system bandwidth, and the respective gains of the tilt and coil torsion modes are likely decreased, thus assisting with faster settle times. Furthermore, the use of the dampers may further reduce the gain of problematic VCM modes.

Extensions and Alternatives

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
   a plurality of disk media rotatably mounted on a spindle;
   a first head slider comprising a read-write head configured to write to and to read from a first disk medium;
   a first actuator-pivot-VCM assembly comprising a first bearing assembly interposed between a first pivot shaft and a first rotary actuator configured to move the first head slider to access portions of the first disk medium via actuation by a first voice coil motor (VCM) assembly;
   a second head slider comprising a read-write head configured to write to and to read from a second disk medium;
   a second actuator-pivot-VCM assembly comprising a second bearing assembly interposed between a second pivot shaft and a second rotary actuator and configured to move the second head slider to access portions of the second disk medium via actuation by a second voice coil motor (VCM) assembly; and
   a central support structure sandwiched between the first and second pivot shafts and between respective pole pieces of the first and second VCM assemblies.

2. The data storage device of claim 1, wherein:
   the central support structure is shaped to make contact with the first VCM assembly and the second VCM assembly at three or more discrete assembly locations; and
   the first VCM assembly, the central support structure, and the second VCM assembly are sandwiched together with a respective common fastener at each of the discrete assembly locations.

3. The data storage device of claim 2, wherein the central support structure comprises:
   a main plate region having a first planar surface; and
   a raised pad, at each of the discrete assembly locations, having a second planar surface a distance from the first planar surface and a hole through which the common fastener is received.

4. The data storage device of claim 1, wherein neither the first VCM assembly nor the second VCM assembly is attached to the central support structure.

5. The data storage device of claim 1, wherein the central support structure comprises one or more dampers positioned in a recessed portion of at least one side of the central support structure.

6. The data storage device of claim 5, wherein the one or more dampers comprise:
   a first viscoelastic damper having one side adhered to one side of the central support structure and an opposing side adhered to the first VCM assembly; and
   a second viscoelastic damper having one side adhered to an opposing side of the central support structure and an opposing side adhered to the second VCM assembly.

7. The data storage device of claim 1, further comprising:
   an enclosure base; and
   a cover;
   wherein:
   the central support structure comprises a main plate region having a first main planar surface and an opposing second main planar surface; and
   the central support structure is further shaped to make contact with the first pivot shaft at a first raised pivot pad having a first pad planar surface a distance from the first main planar surface and a hole through which a common fastener is received, and to make contact with the second pivot shaft at an opposing second raised pivot pad having a second pad planar surface a distance from the second main planar surface and the hole through which the common fastener is received; and
   the first pivot shaft, the central support structure, and the second pivot shaft are sandwiched together with the common fastener through the cover to a post extending through or from the hole.

8. The data storage device of claim 7, wherein the central support structure further comprises a neck area between the first raised pivot pad and the main plate region, and having a third planar surface recessed a distance from the first pad planar surface.

9. The data storage device of claim 7, wherein the central support structure further comprises a neck area between the first raised pivot pad and the main plate region, and having a third planar surface recessed a first distance from the first main planar surface and a greater second distance from the first pad planar surface.

10. The data storage device of claim 7, wherein the central support structure further comprises a viscoelastic ring damper positioned in a recessed portion of at least one of the first and second raised pivot pads and at which the first pivot shaft or the second pivot shaft makes contact with the central support structure.

11. The data storage device of claim 7, wherein the central support structure further comprises:
    a first viscoelastic ring damper positioned in a recessed portion of the first raised pivot pad, at which the first pivot shaft makes contact with the central support structure; and
    a second viscoelastic ring damper positioned in a recessed portion of the opposing second raised pivot pad, at which the second pivot shaft makes contact with the central support structure.

12. The data storage device of claim 1, wherein the central support structure is composed of a ferritic steel material.

13. The data storage device of claim 1, wherein neither the first pivot shaft nor the second pivot shaft is attached to the central support structure.

14. A method of manufacturing a multi-actuator assembly for a hard disk drive, the method comprising:
    positioning a lower actuator-pivot-VCM assembly within an enclosure base of the hard disk drive, wherein the lower actuator-pivot-VCM assembly comprises a lower bearing assembly interposed between a lower pivot shaft and a lower actuator rotatable by a lower voice coil motor (VCM) assembly;
    positioning a support plate structure within the enclosure base and onto the lower actuator-pivot-VCM assembly;
    positioning an upper actuator-pivot-VCM assembly within the enclosure base and onto the support plate structure, wherein the upper actuator-pivot-VCM assembly comprises an upper bearing assembly interposed between an upper pivot shaft and an upper actuator rotatable by an upper voice coil motor (VCM) assembly;
    sandwiching, while not attaching, the support plate structure between respective pole pieces of the lower and upper VCM assemblies by inserting a respective common fastener, at each of one or more common assembly positions, through the lower VCM assembly, the support plate structure, and the upper VCM assembly; and
    inserting a common pivot fastener, at a common pivot position, through a cover of the hard disk drive to a post extending from the enclosure base to sandwich the support plate structure between the upper pivot shaft and the lower pivot shaft.

15. The method of claim 14, wherein the sandwiching comprises:
  making contact between the support plate structure and the lower VCM assembly only at a respective raised pad of the support plate structure at the one or more assembly positions; and
  making contact between the support plate structure and the upper VCM assembly only at a respective raised pad of the support plate structure at the one or more assembly positions.

16. The method of claim 14, wherein the sandwiching comprises:
  compressing a first viscoelastic damper having one side adhered to a first side of the support plate structure and an opposing side adhered to the lower VCM assembly; and
  compressing a second viscoelastic damper having one side adhered to an opposing second side of the support plate structure and an opposing side adhered to the upper VCM assembly.

17. The method of claim 14, wherein the sandwiching comprises:
  making contact between the support plate structure and the upper pivot shaft at an upper raised pivot pad of the support plate structure at the pivot position;
  making contact between the support plate structure and the lower pivot shaft at a lower raised pivot pad of the support plate structure at the pivot position;
  compressing a first viscoelastic ring damper positioned in a recessed portion of the upper raised pivot pad of the support plate structure, at which the upper pivot shaft makes contact with the support plate structure; and
  compressing a second viscoelastic ring damper positioned in a recessed portion of the lower raised pivot pad of the support plate structure, at which the lower pivot shaft makes contact with the support plate structure.

18. A hard disk drive multi-actuator pivot assembly comprising:
  a lower actuator-pivot-VCM assembly comprising:
    a lower bearing assembly interposed between a lower pivot shaft and a lower carriage, and
    a lower voice coil motor (VCM) assembly coupled to the lower carriage;
  an upper actuator-pivot-VCM assembly comprising:
    an upper bearing assembly interposed between an upper pivot shaft and an upper carriage, and
    an upper voice coil motor (VCM) assembly; and
  a central support plate shaped to make contact with and sandwiched between the lower and upper VCM assemblies via a respective common fastener at each of a plurality of assembly locations.

19. A hard disk drive comprising the multi-actuator pivot assembly of claim 18.

20. A hard disk drive multi-actuator system comprising:
  means for stiffening the multi-actuator system at an interface of a first actuator assembly and a second actuator assembly to increase a tilt structural mode frequency of the multi-actuator system, including:
    means for localizing contact of a first voice coil motor assembly of the first actuator assembly and of a second voice coil motor assembly of the second actuator assembly with the means for stiffening;
  wherein the means for stiffening is structurally distinct from the first and second actuator assemblies.

21. The system of claim 20, wherein the means for stiffening further includes:
  means for dissipating transmission of vibrational energy between the first voice coil motor assembly and the second voice coil motor assembly.

22. The system of claim 20, wherein the means for stiffening further includes:
  means for dissipating transmission of vibrational energy between a first pivot shaft of the first actuator assembly and of a second pivot shaft of the second actuator assembly.

* * * * *